United States Patent Office 2,967,389
Patented Jan. 10, 1961

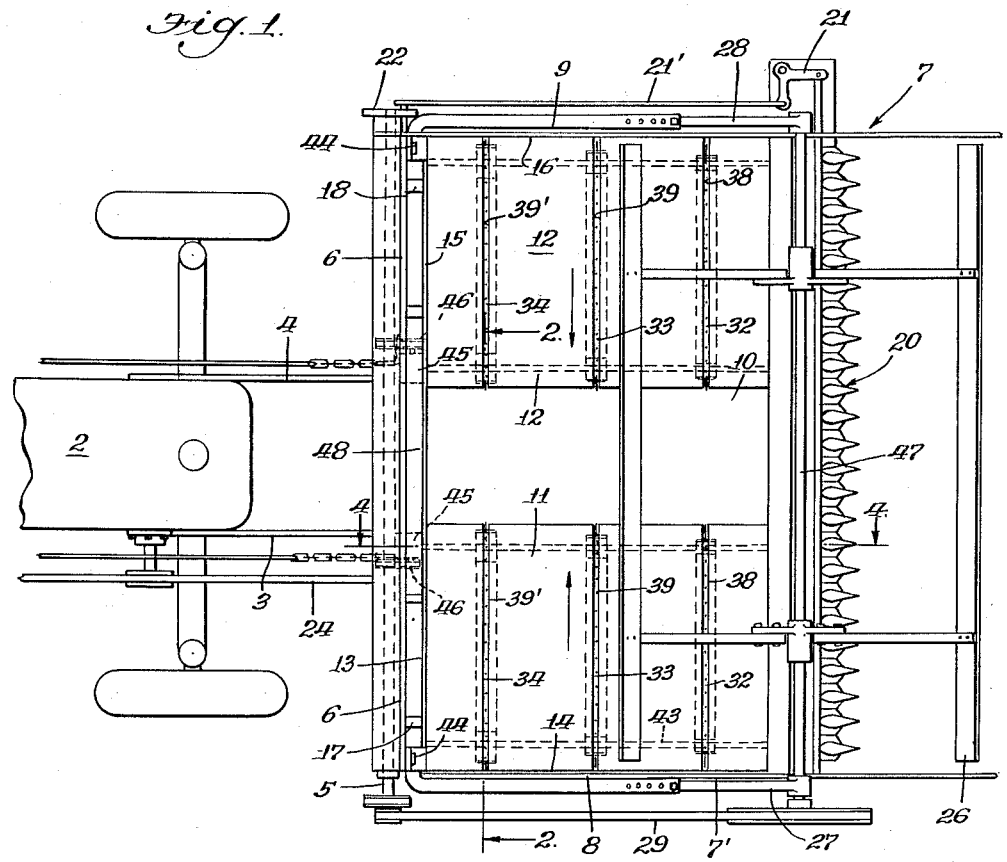

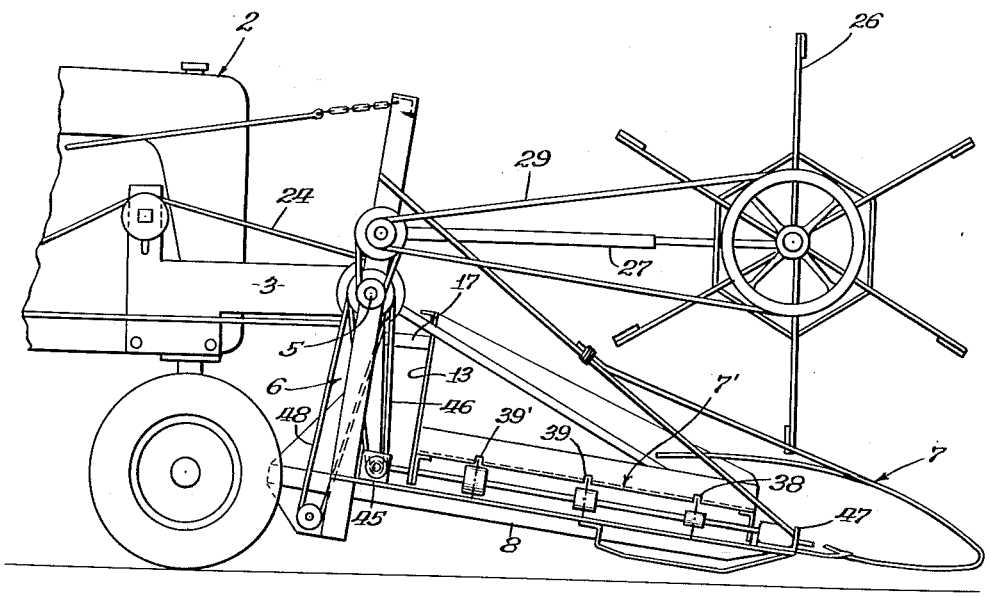

2,967,389

CUTTING AND WINDROWING APPARATUS

William D. Drummond and Grant M. Johnston, Burlington, Ontario, Canada, assignors to International Harvester Company, Chicago, Ill., a corporation of New Jersey Filed July 14, 1958, Ser. No. 748,522

4 Claims. (Cl. 56—192)

This invention relates to windrowers and more particularly to machines particularly adapted for harvesting and windrowing grain.

In the colder climates it is frequently necessary to accelerate the harvest by cutting the matured crops as soon as possible and windrowing the same in order to condition them for threshing and storage.

It is of particular significance that the windrow be formed so that the heads or the grain ends are on top of the windrow where they are in the best position for sun-drying and aeration.

The principal object of the invention is to provide a novel and efficient windrow platform which controls the deposition of the grain so that it is principally raised in a criss-cross fashion with the grain ends uppermost.

A more specific object of the invention is to provide a novel grain deck which incorporates grain-engaging conveying means which operate at different speeds lengthwise of the platform so as to advance the head ends of the grain ahead of the butt ends and to thus deposit the grain in a criss-cross shingle fashion with the head ends up and the butt or root ends of the plants down to the ground.

A still further object of the invention is to provide a novel windrow forming device wherein the position of the plants is such that a maximum amount of grain is adapted to be saved when it is picked by a harvester.

These and other objects of the invention will become more apparent from the specification and the drawings, wherein:

Fig. 1 is a plan view of an exemplary form of windrower incorporating the invention;

Fig. 2 is an enlarged fragmentary sectional view taken substantially on the line 2—2 of Fig. 1;

Fig. 3 is a side elevational view of the structure shown in Fig. 1; and

Fig. 4 is an enlarged transverse vertical sectional view taken substantially on the line 4—4 of Fig. 1.

Describing the invention in detail and having particular reference to the drawings, there is shown a self-propelled ambulatory power unit 2 which may be in the form of a tractor which carries forwardly extending mounting arms 3 and 4 on the forward end of which there is rotatably mounted a combination pivot shaft and power transmitting shaft 5 in which there is mounted the rear framework 6 of a harvester generally designated 7. The harvester includes a platform 7' which may include the laterally spaced sections or side portions 8 and 9 which define a crop windrow or crop discharge space 10 wherein the windrow is formed. The portions 8 and 9 include the platform panel 11 and 12 to which are connected the upstanding side rear wall or panel portions 13, 14 and 15, 16, the rear panel portions 13 and 15 being connected as by braces 17 and 18 to the rear framework 6.

At the leading edge of the platform 7' there is provided the usual sickle or cutter bar 20 which is adapted to cut the grain, the sickle being suitably powered by the bellcrank 21 which is driven by a pitman 21' from a crank 22 which in turn is driven from the power shaft 5, the shaft 5 being driven by belt 24 which is driven by the side power take-off of the tractor, as is well known to those skilled in the art.

The grain which is cut by the sickle is moved onto the platform by the reel 26 which is carried by arms 27, 28 which are suitably anchored on the rear frame structure 6 and the reel is driven by the belt and pulley drive 29 from the shaft 5, as best seen in Figs. 1 and 3.

The feature of the present invention is in the drive for the conveying means generally designated 30 and 31 which are associated with the platforms 8 and 9 respectively and since the conveyors are identical their parts will be correspondingly numbered. The conveying means take the form of a plurality of belts 32, 33 and 34 comprising the outstanding fingers 35, 36 and 37 which project through slots 38, 39 and 39', in the associated platform 8 or 9. The belts 32, 33 and 34 are carried respectively on the sprockets or wheels 40, 41 and 42 which are connected to a common shaft 43 which is disposed beneath the platform 8 and mounted at its forward end in a bearing 44 carried on the platform underframe. The outer shafts 43 are mounted at their rear in bearings 44 and the inner shafts 43 are mounted at their rear in a gear box 45 through which it is driven by a belt and pulley drive 46 which is driven from the shaft 5.

It will be noted that the sprockets 40, 41 and 42 are of gradually increased size and therefore the peripheral speed from front 47 to the rear 48 of the platform of the belts 32, 33 and 34 is progressively increased. As best seen in Fig. 3, the normal downward and forward inclination of the platform accommodates the three different sized sprockets underneath and it will be readily noted that as the grain is cut by the sickle structure 20 at the forward end of the platform that the stems of the grain adjacent to the root ends are crowded onto the deck 8 first and the head ends of the grain fall rearwardly and thus the acceleration in the speed of the conveying means at the rear of the platform with respect to the forward edge of the platform insures that the head ends of the grain will discharge off the platform first into the windrow space 10 from both sides of the platform and thus the heads will stack pyramidally against each other as shown in Fig. 2 and the root or base end of the grain will be spread out and will lay along the ground.

What is claimed is:

1. A windrower having a platform structure with a front transverse cutter bar thereon, at least three conveyors on the platform structure spaced from each other rearwardly of the cutter bar and having top conveying means, differential speed driving means connected to said conveyors for moving the same in the same direction at different speeds, the speeds increasing rearwardly from the cutter bar.

2. The invention according to claim 1 and each conveying means comprising a belt having an upper run, and driving meas for the belts mounted on the structure and comprising pulleys of increasing diameter in a direction away from the cutter bar.

3. The invention according to claim 1 and said platform structure comprising a pair of spaced sections defining a discharge opening therebetween, and said conveying means disposed on each of said sections and discharging toward said opening.

4. The invention according to claim 1 and stationary platform means on opposite sides of each conveyor.

References Cited in the file of this patent

UNITED STATES PATENTS

| | | |
|---|---|---|
| 221,690 | Miller | Nov. 18, 1879 |
| 1,102,847 | Zahn | July 7, 1914 |
| 1,212,011 | Brugmann | Jan. 9, 1917 |
| 2,492,223 | Jenson | Dec. 27, 1949 |
| 2,510,245 | Munter | June 6, 1950 |